United States Patent
Eichen et al.

(10) Patent No.: US 9,037,115 B2
(45) Date of Patent: May 19, 2015

(54) VOICEMAIL HANDLING FOR CONVERGENCE COMMUNICATION SYSTEM

(75) Inventors: Elliot G. Eichen, Arlington, MA (US); Lee N. Goodman, Tyngsboro, MA (US); James Flynn, Stoughton, MA (US); Sujin Catherine Chang, Stow, MA (US); Rafael Andres Gaviria Velez, Medford, MA (US); Rezwanul Azim, Arlington, MA (US); Gowtham Javaregowda, Waltham, MA (US); Punita Mishra, Potomac, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 745 days.

(21) Appl. No.: 13/231,585

(22) Filed: Sep. 13, 2011

(65) Prior Publication Data
US 2013/0065561 A1    Mar. 14, 2013

(51) Int. Cl.
*H04W 4/16* (2009.01)
*H04W 4/12* (2009.01)

(52) U.S. Cl.
CPC .................................... *H04W 4/16* (2013.01)

(58) Field of Classification Search
CPC .................................. H04W 4/12; H04W 4/16
USPC ............ 455/412.1, 413, 414.1, 415; 370/216, 370/352
See application file for complete search history.

(56) References Cited

U.S. PATENT DOCUMENTS

| | | | |
|---|---|---|---|
| 7,408,925 B1 * | 8/2008 | Boyle et al. | 370/352 |
| 8,233,888 B1 * | 7/2012 | Koller et al. | 455/412.1 |
| 2010/0220585 A1 * | 9/2010 | Poulson et al. | 370/216 |

* cited by examiner

*Primary Examiner* — Myron K Wyche (57) ABSTRACT

A method includes receiving, at a computing device, a call originally directed to a mobile device, and forwarding the call to at least one other device. The method further includes determining that the forwarded call is not answered by the at least one other device and forwarding two versions of the call to the mobile device, such that one of the two versions of the call is automatically directed toward a voicemail account associated with the mobile device. The other of the two versions of the call is then canceled.

20 Claims, 7 Drawing Sheets

VOICEMAIL HANDLING FOR CONVERGENCE COMMUNICATION SYSTEM

BACKGROUND INFORMATION

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN), which typically incur much higher costs to carry phone calls from sources to destinations. By using VoIP (e.g., IP packets carrying audio data) for carrying a call for most of the distance of the call, instead of using a PSTN, the cost of the call can be reduced relative to using the PSTN carry call. Usually, VoIP involves a call being carried via the Internet to a point in the PSTN close to the call destination. At that point, the call is switched to the PSTN for completion of the connection with the call destination. By minimizing the distance over which the call is carried on the PSTN, the cost of the call may be substantially reduced relative to solely using the PSTN.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to a converged voice calling system (sometimes referred to as a call convergence plan or program, or fixed mobile convergence (FMC) system) in which calls to a user are forwarded or otherwise made available to multiple devices associated with a user, such as a mobile telephone, a landline or fixed telephone, or a VoIP-based telephone. In one implementation, calls placed to a particular device (such as a user's mobile telephone), although first routed to additional devices via an established convergence profile, are returned to a voicemail box associated with the called device when unanswered, rather than deposited into a unified convergence voicemail box.

Figure 1:
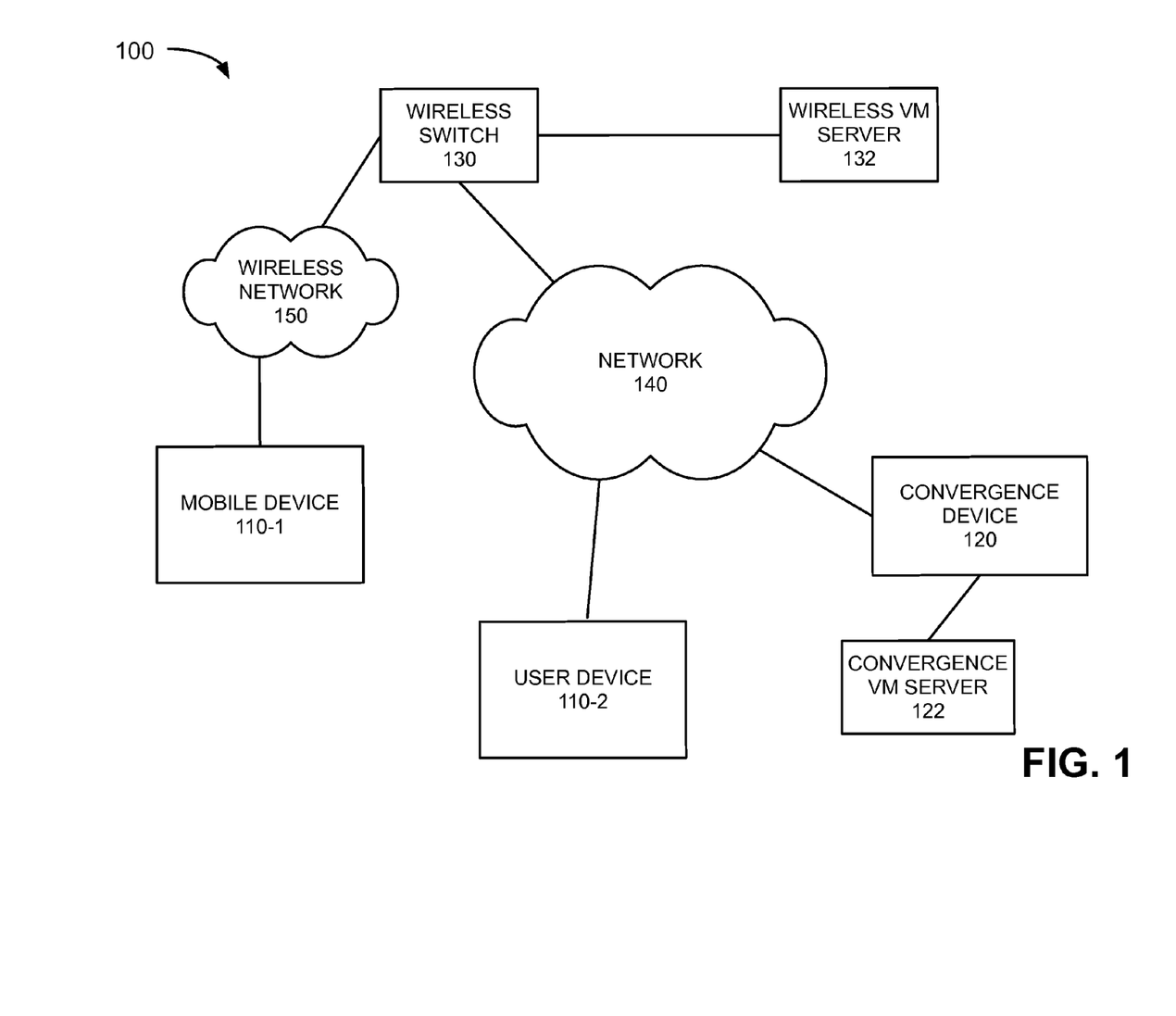
FIG. 1 illustrates an exemplary network in which systems and methods described herein may be implemented.

FIG. 1 is a block diagram of an exemplary network 100 in which systems and methods described herein may be implemented. As shown, network 100 may include mobile device 110-1, user device 110-2, convergence device 120, convergence voicemail server 122, wireless switch 130, wireless voicemail server 132, network 140, and wireless network 150.

Mobile device 110-1 may include, for example, a cellular telephone (e.g., a smart phone), a tablet computer, a personal digital assistant (PDA), a netbook or another type of digital computing device that has the capability to communicate via one or more networks, such as network 140 and/or network 150. As discussed below, in some instances, mobile device 110-1 may be "docked" with a docking station or other device (such as user device 110-2), such that functionality of mobile device 110-1 may be shared with user device 110-2.

User device 110-2 may include a Voice over Internet Protocol (VoIP) device, such as a VoIP telephone, a computer, a tablet device, or a docking station device that has a connection to a VoIP network (e.g., network 140). As described above, in some instances, user device 110-2 may include a docking port that permits a mobile device (e.g., mobile device 110-1) to be "docked" with user device 110-2. While in a docked or connected configuration, user device 110-2 may interact with mobile device 110-1 and also communicate with network 140 via a wired or wireless connection. For example, user device 110-2 may connect to other devices in network 100 via a local area network (LAN), wide area network (WAN) or metropolitan area network (MAN) included in network 140.

Convergence device 120 may include a software switch (also referred to as a "softswitch") or other device configured to receive calls (e.g., VoIP calls, public switched telephone network (PSTN) calls, video calls, wireless network calls, etc.) or messages (e.g., instant messages, short message service (SMS) messages, multimedia messages (MMS), etc.) destined for mobile device 110-1 and/or user device 110-2. For example, convergence device 120 may be configured to receive calls via network 140 (e.g., a PSTN network, an IP network, etc.). The calls may be forwarded to mobile/user devices 110 based on, for example, a convergence profile associated with a user. The convergence profile may indicate what devices to forward calls to, the circumstances for the forwarding (e.g., time of day, day of week, personnel presence indicator, etc.), the ordering of the called devices, etc.

As described below, convergence device 120 may be configured to forward calls to convergence VM server 122 when, for example, a user does not answer the call at any device to which the call was forwarded, when a user affirmatively "sends" a call to voicemail, or when conditions or rules in the convergence profile indicate that a received call is to be automatically forwarded to voicemail.

Convergence voicemail (VM) server 122 may include a device or combination of devices configured to receive and store voicemail messages associated with convergence device 120. For example, convergence VM server 122 may be configured to receive a call from convergence device 120 after a period of time in which no device associated with convergence device 120 (e.g., mobile device 110-1 or user device 110-2) acknowledges (e.g., answers) the call, etc. Convergence VM server 122 may be configured to query a caller to leave a message, store any such message, and provide subsequent access to the message in a variety of manners, such as via an automated telephone interface, via a web-based interface, via a push notification interface, etc.

Consistent with implementations described herein, convergence device 120 and/or convergence VM server 122 may be configured to perform additional call processing in response to receipt of a call or message from a particular user device (e.g., mobile device 110-1, user device 110-2, etc.), or type of user device. For example, convergence device 120 and/or convergence VM server 122 may be configured to re-route or re-direct one or more calls to a different device.

Similar to convergence device 120, wireless switch 130 (also referred to as mobile switching center 130) may include one or more devices for receiving and forwarding calls (e.g., VoIP calls, public switched telephone network (PSTN) calls, video calls, wireless network calls, etc.) or messages (e.g., instant messages, short message service (SMS) messages, multimedia messages (MMS), etc.) to/from mobile device 110-1. Wireless switch 130 may interface with wired networks (e.g., network 140) and wireless networks (e.g., wireless network 150) to forward calls toward their intended destinations.

In some implementations consistent with embodiments described herein, wireless switch 130 may be configured to support call forward busy no answer (CFBNA) functionality, in which unanswered calls to a mobile device (e.g., mobile device 110-1) are forwarded to a predetermined telephone number or address. In aspects described herein, wireless switch 130 may be configured to support CFBNA functionality by forwarding unanswered calls to convergence device 120 for handling pursuant to an established convergence program.

Consistent with embodiments described herein, wireless switch 130 may be configured to forward calls to wireless VM server 132 when another call has been previously forwarded to mobile device 110-1 and has not yet been either answered, canceled, or forwarded to voicemail.

Wireless voicemail (VM) server 132 may include a device or combination of devices configured to receive and store voicemail messages associated with mobile device 110-1. For example, wireless VM server 132 may be configured to receive calls from wireless switch 130 after a period of time in which mobile device 110-1 fails to acknowledge (e.g., answer) a call, affirmatively forwards a call to voicemail (e.g., rejects the call), etc. Wireless VM server 132 may be configured to query a caller to leave a message, store any such a message, and provide subsequent access to the message in a variety of manners, such as via an automated telephone interface, a web-based interface, push notifications, etc.

Network 140 may include one or more wired, wireless and/or optical networks that are capable of receiving and transmitting data, voice and/or video signals, including multimedia signals that include voice, data and video information. For example, network 140 may include one or more public switched telephone networks (PSTNs) or another type of switched network. Network 140 may further include one or more satellite networks, one or more optical networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of receiving and transmitting data.

Wireless network 150 may include one or more wireless networks and may include a number of transmission towers for receiving wireless signals and forwarding the wireless signals toward the intended destinations. For example, wireless network 150 may include a Global System for Mobile communications (GSM) network, Universal Mobile Telecommunications System (UMTS) network, Long Term Evolution (LTE) network, LTE-Advanced network, or another type of wireless network.

The exemplary configuration illustrated in FIG. 1 is provided for simplicity. It should be understood that a typical network may include more or fewer devices than those illustrated in FIG. 1. For example, network 100 may include hundreds or thousands of devices 110, 120, 130, and multiple networks 140/150. Networks 140/150 may also include additional elements, such as switches, gateways, routers, backend systems, etc., that aid in routing information, such as data to/from mobile device 110-1, user device 110-2, convergence device 120 and/or wireless switch 130. Convergence device 120 and convergence voicemail server 122 are shown as separate devices in FIG. 1, in other implementations, the functions performed by two or more of these devices may be performed by a single device. Also, in some instances, one or more of the devices of network 100 may perform one or more functions described as being performed by another one or more of the devices of network 100.

Figure 2:
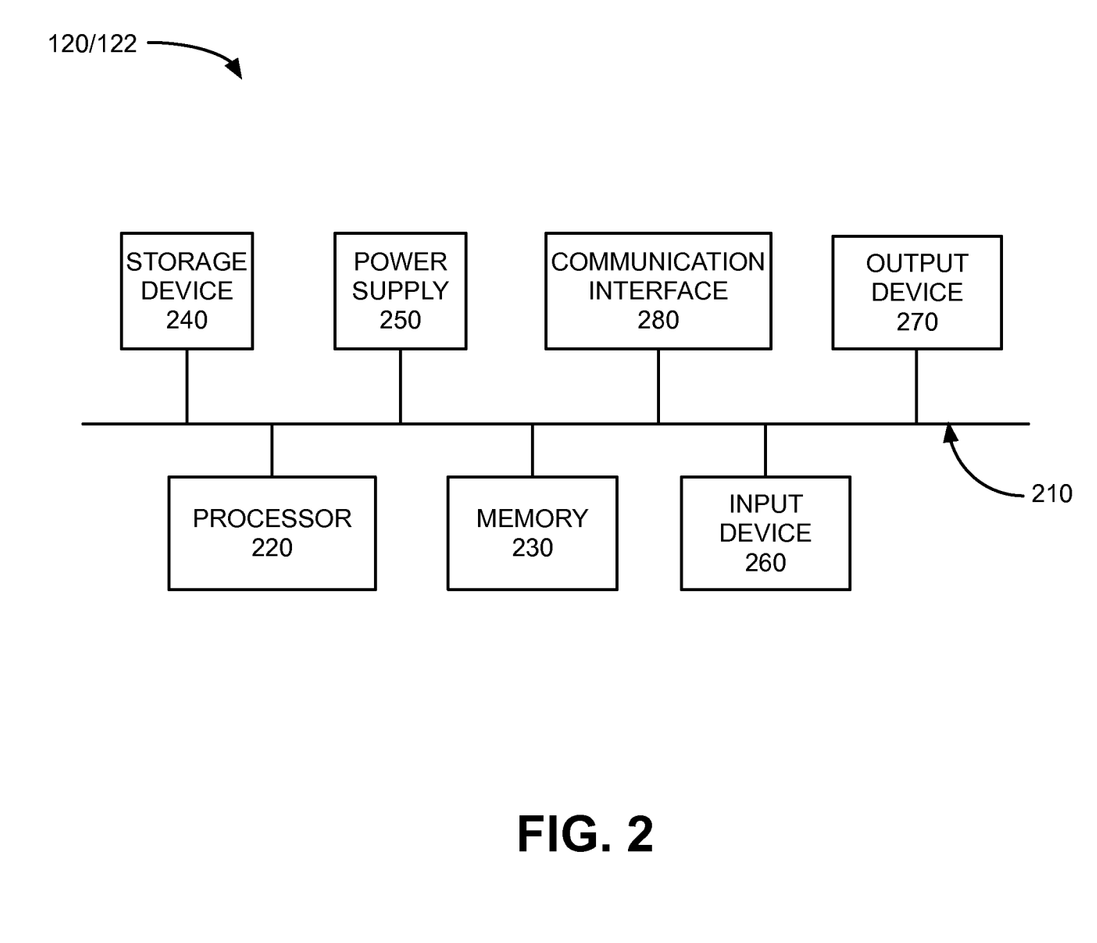
FIG. 2 is a block diagram illustrating an exemplary configuration of components implemented in one or more of the devices of FIG. 1.

FIG. 2 is a diagram illustrating components of an exemplary convergence device 120 or convergence VM server 122. Referring to FIG. 2, device 120/122 may include a bus 210, processor 220, memory 230, storage device 240, power supply 250, input device 260, output device 270, and communication interface 280. Depending on the implementation, device 105/120 may be configured in a number of different ways and may include other or different components. For example, device 120/122 may include one or more interfaces, modulators, demodulators, encoders, decoders, etc., for processing data.

Bus 210 may include a path that permits communication among the elements of device 120/122. Processor 220 may include one or more processors, microprocessors, application specific integrated circuits (ASICs), field programmable gate arrays (FPGAs), or other processing logic that may interpret and execute instructions. Memory 230 may include a random access memory (RAM) or another type of dynamic or static (e.g., read only memory (ROM)) storage device that may store information and instructions for execution by processor 220. Storage device 240 may include a magnetic and/or optical recording medium and its corresponding drive. Power supply 250 may include a battery or other power source for device 120/122.

Input device 260 may permit a user to input information to device 120/122, such as a camera, a sensor (e.g., a motion detector), microphone, a keypad, a keyboard, a touch screen, a mouse, a pen, etc. Output device 270 may output information to the user, such as a display, a printer, one or more speakers, etc.

Communication interface 280 may include a transceiver that enables device 120/122 to communicate with other devices and/or systems, such as mobile device 110-1, user device 110-2, wireless switch 130, or other devices in network 140. For example, communication interface 280 may include interfaces, such as a modem or Ethernet interface, for communicating via a network, such as network 140.

In implementations consistent with embodiments described herein, device 120/122 may perform processing associated with voicemail handling in a convergence system. Device 120/122 may perform these operations in response to processor 220 executing sequences of instructions contained in a computer-readable medium, such as memory 230. A computer-readable medium may include a physical or logical memory device. The software instructions may be read into memory 230 from another computer-readable medium, such as data storage device 240, or from another device via communication interface 280. The software instructions contained in memory 230 may cause processor 220 to perform processes that are described below. Alternatively, hard-wired circuitry may be used in place of or in combination with software instructions to implement processes consistent with the embodiments described herein. Thus, implementations described herein are not limited to any specific combination of hardware circuitry and software. For the purposes of this application, a "computer" may be defined as a device, or combination of devices, that performs high-speed mathematical or logical operations, or that assembles, stores, correlates, or otherwise processes information.

The configuration of components of convergence device 120 and/or convergence voicemail server 122 illustrated in FIG. 2 is for illustrative purposes only. Other configurations may be implemented. For example, in other implementations, convergence device 120 and/or convergence voicemail server 122 may include additional, fewer and/or different components than those depicted in FIG. 2.

Figure 3:
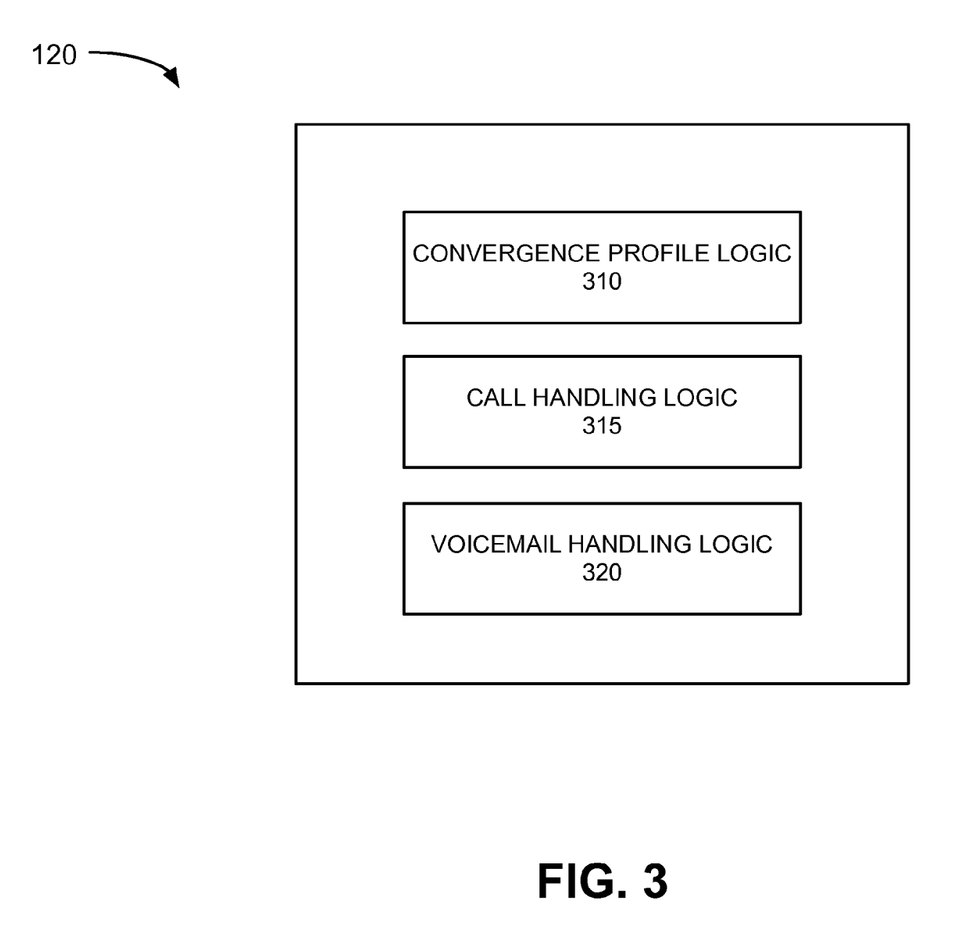
FIG. 3 is a functional block diagram of exemplary components implemented in the convergence device of FIG. 1.

Wireless switch 130 and/or wireless VM server 132 may be configured in a similar manner as devices 120/122 illustrated in FIG. 3. For example, switch 130 and/or server 132 may include one or more processors 220, memories 230, storage devices 240, input devices 260, output devices 270 and communications interfaces 280, as described above.

FIG. 3 is an exemplary functional block diagram of components implemented in convergence device 120. As shown, convergence device 120 may include convergence profile logic 310, call handling logic 315, and voicemail handling logic 320. In an exemplary implementation, all or some of the components illustrated in FIG. 3 may be stored in memory 230 of convergence device 120.

Convergence profile logic 310 may include logic configured to receive and/or store a convergence profile associated with a user of mobile device 110-1 and user device 110-2. For example, as briefly described above, a convergence profile may be established to define devices associated with a particular convergence account (e.g., mobile device 110-1, user device 110-2, etc.), the forwarding of calls across such devices, the handling of calls from particular callers or groups of callers, call screening functionality, etc.

Figure 4:
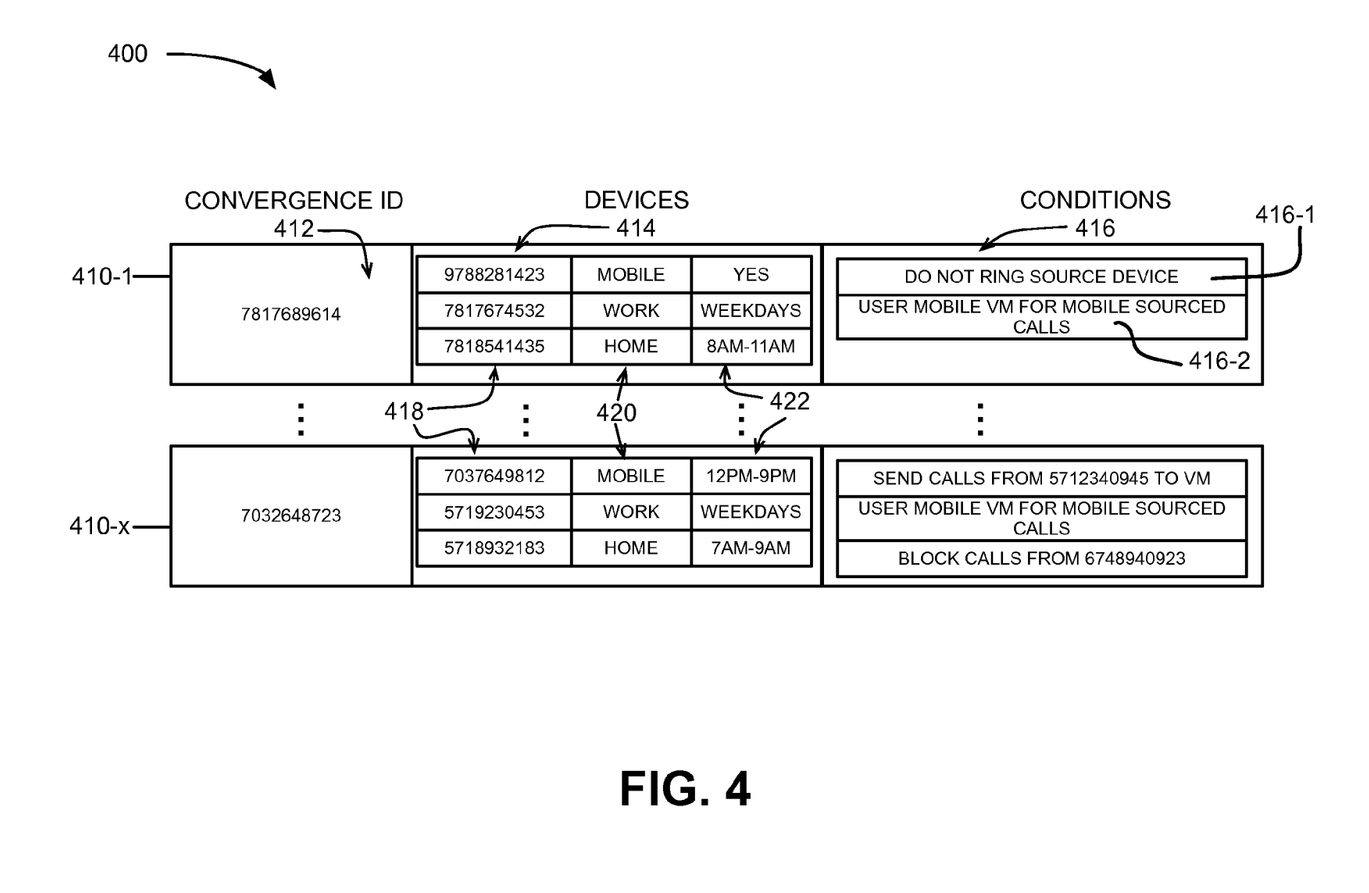
FIG. 4 is a diagram of an exemplary convergence profile stored or received by the convergence profile logic of FIG. 3.

FIG. 4 is a diagram of an exemplary convergence profile 400 stored or received by convergence profile logic 310. As shown, convergence profile 400 may include a table or database having a number of entries 410-1 to 410-x. Each entry 410 may correspond to a particular convergence user or convergence account and may include a number of fields corresponding to features and capabilities associated with the account. For example, each entry 410 in profile 400 may include convergence identifier (ID) field 412, device fields 414-1 to 414-n, and condition fields 416-1 to 416-m. As shown, device fields 414 may include a number of sub-fields, including a device ID sub-field 418, device type sub-field 420 and active sub-field 422.

Convergence ID field 412 may include an identifier or other value representative of the convergence account or a convergence user. For example, in some implementations, convergence ID may include a telephone number, a session initiation protocol (SIP) address, a VoIP number, an email address, etc. For purposes of this description, assume that convergence ID includes a telephone number having a traditional 10-digit format.

Device fields 414-1 to 414-n, and their corresponding sub-fields 418-422 may include information relating to other devices (e.g., user device 110-2 and mobile device 110-1) associated with the convergence identifier (e.g., with a particular entry 410). For example, device ID sub-field 418 may include a telephone number (or other identifier) associated with a particular device, such as mobile device 110-1, user device 110-2, etc. Device type sub-field 420 may include an indication of a type of device identified in device ID sub-field 418, such as "mobile," "home," "office," etc.

Active sub-field 422 may include an indication of whether call convergence is enabled or active for the device identified in device ID sub-field 418. For example, an interface associated with convergence device 120 (e.g., a web interface, an application user interface, etc.) may be configured to receive instructions from a user or administrator relating to whether particular devices are active in the call convergence program or plan, times during which they are active, etc. Accordingly, active sub-field 422 may include values indicative of this information, with such values as "always," "work days," "timeA-timeB," "dayC-dayD," etc. An "always" value may indicate that the particular device is always active within the convergence program. A "work days" value may indicate that the particular device is to be active in the convergence program for predefined work day intervals, such as Monday through Friday from 9 AM to 5 PM. A "timeA-timeB" value may indicate a particular time range during which the particular device is active, such as "8 AM-11 AM." A "dayC-dayD" value may indicate a particular day range during which the particular device is active, such as "MON-THU." In some instances, multiple values may be included within active sub-field 420, indicating that more than one rule should be applied, such as values of "8 AM-11 AM" and "MON-THU" indicating that the particular device is only active within the convergence program on Mondays to Thursdays from 8 AM to 11 AM.

Condition fields 416-1 to 416-m may include information relating to the instances or circumstances in which convergence-related actions may or may not be performed. For example, as shown in entry 410-1, condition field 416-1 includes a value of "do not ring source device," indicating that a call deposited or forwarded to the convergence program from a particular device included in the convergence program (e.g., one of devices identified in device ID sub-fields 418) should not be rung as part of the convergence program. This prevents calls forwarded from a device (e.g., unanswered calls originally destined for a users work phone) from being immediately forwarded back to the forwarding device, resulting in a loop.

Condition field 416-2 includes a value of "use mobile VM for mobile sourced calls," indicating that a call deposited or forwarded to the convergence program from a mobile device included in the convergence program (e.g., mobile device 110-1) and not answered via the convergence system, should be forwarded to a voicemail system associated with the mobile device. Additional details relating these conditions are described below. Other condition field values may include blocked call identifications, immediate voicemail activation (e.g., do not disturb functionality), etc.

Returning to FIG. 3, call handling logic 315 may include logic configured to receive calls from network 140, process the calls based on information in profile logic, and forward the calls based on the processing. For example, call handling logic 315 may be configured to identify, from device fields 414-1 to 414-n, one or more devices to which to forward a received call. Call handling logic 315 may also be configured to examine active sub-fields 420 and condition fields 416 to determine other call processing features, such as whether to ring/not ring a particular device, forward a received call to convergence voicemail, block a call, or forward a received call to wireless voicemail.

Voicemail handling logic 320 may be configured to receive a call from call handling logic 315 and forward the call to either convergence VM server 122 or wireless VM server 132 based on information in convergence profile 400 and information associated with the received call. For example, voicemail handling logic 320 may be configured to, upon receipt of a call from call handling logic 315 (e.g., after a predetermined period of no called device answering the convergence call), determine a destination voicemail server based on, among other things, an original called number (OCN) identifier associated with the call. The OCN (sometimes referred to as the original dialed number (ODN) includes an indication of the original, as entered, telephone number (or address) provided by a calling device or party. For example, calls initially directed to a device that is included in a convergence program (e.g., mobile device 110-1) may, in some circumstances, be forwarded to convergence device 120, which may be assigned a different number or address than mobile device 110-1. The call received by call handling logic 315 may include an OCN identifier or field, thereby allowing call handling logic 315 to maintain knowledge about the originally called device, number, or address. Based on the type of the original communication, the OCN or ODN identifier may be provided in a variety or mechanisms, such as signaling system 7 (SS7) signaling for PSTN calls, a SIP header field for VoIP calls (e.g., a Diversion header field in a SIP INVITE message), etc.

When voicemail handling logic 320 determines that the originally called device is a mobile device, voicemail handling logic 320 may determine, based on the convergence profile, whether voicemails associated with the mobile device are to be forwarded or directed toward the voicemail system (e.g., wireless VM server 132) associated with the mobile device. As described above, convergence profile 400 may include, e.g., in a condition field 416, a value indicating that a call deposited or forwarded to the convergence program from a mobile device included in the convergence program (e.g., mobile device 110-1), that is not answered via the convergence system, should be forwarded to wireless VM server 132.

In a conventional wireless system, calls are deposited or forwarded to wireless VM server 132 by initially being directed to a particular mobile device (e.g., mobile device 110-1). When a user either does not answer or affirmatively rejects the call, the mobile device, working within its own VM system, forwards the call to a predetermined voicemail number or address, typically configured within the mobile device. An identification of the voicemail number associated with the wireless network 150 may not be known or easily available to entities or devices outside of the wireless network system. Alternatively, calls to the voicemail number may not be authorized by non-associated devices (e.g., devices not associated with wireless network 150). Accordingly, it is difficult to directly forward calls to wireless VM server 132 from outside of wireless network 150 or a system associated with wireless network 150, due in to technological differences between various wireless networks and providers of such networks.

Consistent with embodiments described herein, voicemail handling logic 320 may be configured to predictably forward calls originally directed to a mobile device, such as mobile device 110-1, to wireless VM server 132. More specifically, voicemail handling logic 320 may be configured to determine whether a condition that would initiate such a transfer exists based on information included within the received call and information included within the associated convergence profile. Such a condition may be identified when 1) the received call originated from a mobile device associated with the convergence program (e.g., based on the OCN or header information for the received call) and 2) the feature of "use mobile VM for mobile sourced calls" has been enabled (e.g., included in the convergence profile) for the particular convergence account.

At this point, voicemail handling logic 320 may be configured to forward two (2) versions of the received call back to the mobile device (e.g., mobile device 110-1) via wireless switch 130. For example, voicemail handling logic 320 may output two versions of the call in which the TO identifier is set based on the identified OCN or Diversion header associated with the mobile device. In such instance, wireless switch 130 may pass one of the calls to the mobile device and automatically forward the second of the calls to wireless VM server 132. After a predetermined (brief) period of time (e.g., 1-5 seconds), the first call to the mobile device may be terminated, leaving only the call forwarded to wireless VM server 132. In one implementation, voicemail handling logic 320 may monitor each call to determine which call is answered (e.g., the VM call) and which call is "ringing" (e.g., the mobile device call) to determine which call to terminate.

In some embodiments, voicemail handling logic 320 may include a known "dummy" FROM number or address in one or both of the calls. Mobile device 110-1 may be configured to ignore or otherwise disregard this "dummy" number. For example, an address book application on mobile device 110-1 may be configured with an entry that identifies the dummy number as a number to ignore, thereby resulting in no audible or visible alerts for calls "from" that number.

If a condition indicating that voicemails associated with the mobile device are to be forwarded or directed toward the wireless voicemail system is not identified, voicemail handling logic 320 may forward the call to convergence VM server 122 in a typical manner. Convergence VM server 122 may be configured, upon receipt of the call, to answer the call with a voicemail greeting, record a message from a caller, and store the message for subsequent retrieval. In some implementations, convergence VM server 122 is configured to identify and output a particular greeting for a call based on information in convergence profile 400, such as an indication of a caller group (e.g., work, friends, family, etc.), greetings associated with particular callers (e.g., based on caller ID information associated with the call), etc.

Additionally, in some implementations, convergence VM server 122 may be configured to provide a user interface or push notification system for stored VM messages. For example, convergence VM server 122 may be configured to include a web server for providing or serving stored voicemail messages to a user. In other implementations, convergence VM server 122 is configured to transmit or forward notifications (or actual VM messages) to one or more user devices, such as mobile device 110-1 or user device 110-2, based on, for example, information stored in convergence profile 400.

Consistent with embodiments described herein, features of convergence device 120 may be implemented in a number of physically or logically distinct devices, such as a first device for performing convergence call switching and handling (e.g., convergence profile and convergence call handling features) and a second device for implementing the mobile voicemail redirection feature, such as for generating the two calls to mobile device 110-1, modifying the FROM information in one or both of the calls, and terminating one of the calls when the second call is answered by the wireless voicemail server.

Figure 5:
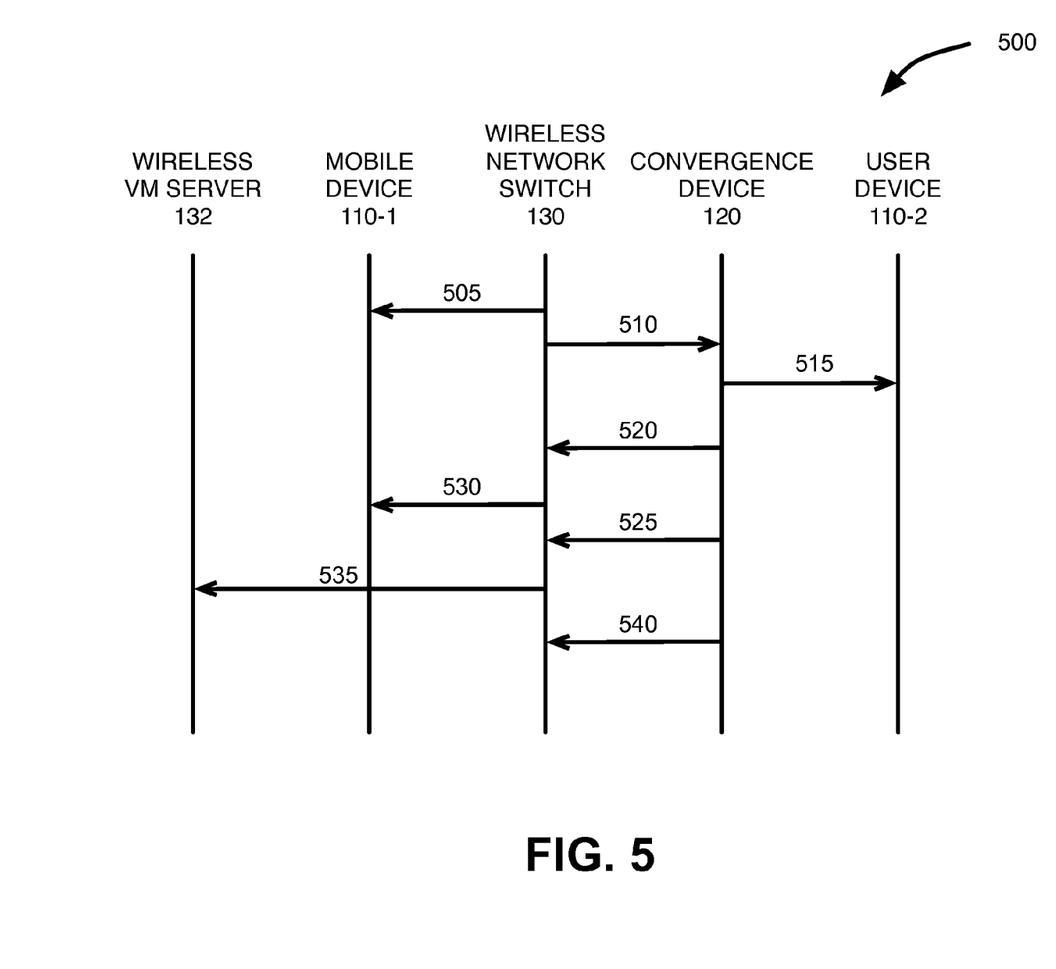
FIG. 5 is a call flow diagram illustrating exemplary processing associated with components of the network of FIG. 1.

FIG. 5 is a call flow diagram 500 illustrating exemplary processing associated with components of network 100. Processing may begin with a call (505) directed to mobile device 110-1 via network wireless switch 130 (e.g., from network 140/150). Assume that wireless network switch 130 is configured to forward unanswered or busy calls to mobile device 110-1 (e.g., via a CFBNA function) to convergence device 120. Accordingly, when call 505 is not answered at mobile device 110-1, the call may be forwarded (510) to convergence device 120 via network 140.

As described above, convergence device 120 may process the received call to identify an associated convergence profile (e.g., convergence profile 400) and, based on the information in the convergence profile may forward (515) the received call to user device 110-2. Assume that the call remains unanswered. At this point, convergence device 120 (e.g., voicemail handling logic 320) determines that the mobile call to mobile VM condition is enabled in the convergence profile and forwards two (2) substantially simultaneous calls (520) and (525) to wireless switch 130 destined for mobile device 110-1. The first call is forwarded (530) to mobile device 110-1 and the second call is forwarded (535) to wireless VM server 132. Convergence device 120 then cancels (540) the first call (530) destined for mobile device 110-1.

Figure 6:
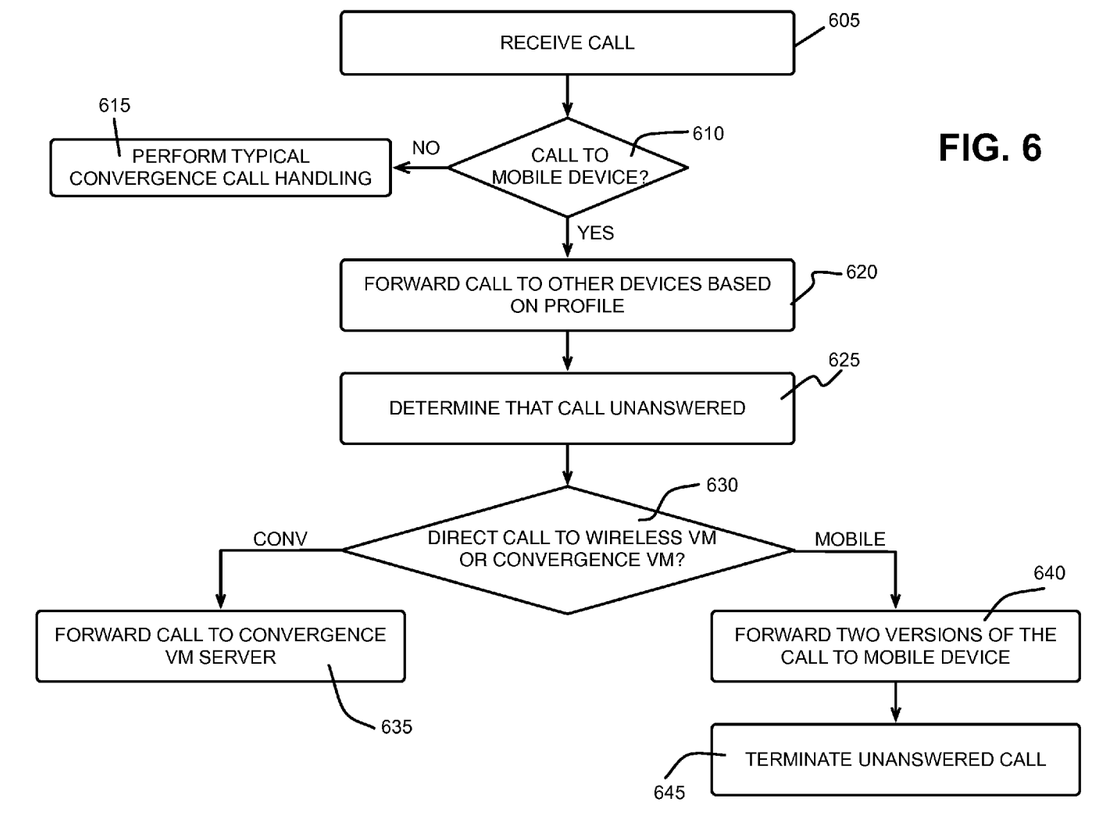
FIG. 6 is a flow diagram of exemplary processing associated with embodiments described herein.

FIG. 6 is a flow diagram 600 of exemplary processing associated with components of convergence device 120. Processing may begin with convergence device 120 receiving a call forwarded by wireless switch 130 (block 605). For example, call handling logic 315 in convergence device 120 may receive a call via network 140, such as a PSTN or IP network.

Convergence device 120 may determine whether the call was originally directed to a mobile device associated with a convergence plan (block 610). For example, call handling logic 315 may determine whether the received call includes an OCN or Diversion header field value corresponding to a mobile device associated with an identified convergence program, such as an OCN associated with mobile device 110-1 stored in a convergence profile (e.g., convergence profile 400). In some implementations, call handling logic 315 may be configured to inspect data relating to received calls immediately upon receipt of the call.

When it is determined that the received call was not originally directed to a mobile device associated with a convergence profile (block 610—NO), typical convergence call handling may proceed (block 615). For example, the call may be re-directed toward one or more other devices, forwarded to voicemail, blocked, etc. in accordance with an associated convergence profile.

However, when it is determined that the received call was originally directed to a mobile device associated with a convergence profile (e.g., via a CFBNA setting for mobile device configured on wireless switch 130) (block 610—YES), convergence device 120 may forward the call to other devices based on information included in the convergence profile (block 620). For example, call handling device 315 may forward the call to user device 110-2 based on values included within the device fields 414 and condition fields 416 in profile 400.

Convergence device 120 may determine that the forwarded call has not been answered by any device to which the call was forwarded (block 625). For example, a predetermined time may elapse or number of "rings" may occur following forwarding of the call. Alternatively, convergence device 120 may determine that the received call is to be immediately forwarded to voicemail (e.g., a do not disturb condition). In any event, convergence device 120 may then determine whether the call should be directed to wireless voicemail or convergence voicemail (block 630). For example, it may be determined whether a condition field value for this feature in the convergence profile has been set, such as "use mobile VM for mobile sourced calls" condition. In other implementations, this feature may be set as a default for convergence accounts and need not be independently configured in each convergence profile. In other implementations, all calls or any type of calls received by convergence device 120 (e.g., from specific callers, directed to specific telephone lines or addresses, during particular times of day, etc.) may be forwarded to wireless VM server in the manner described below.

When it is determined that call should be directed to convergence voicemail (block 630—CONV), convergence device 120 may forward the call to convergence VM server 122 (block 635). For example, voicemail handling logic 320 may forward the call to convergence VM server 122. However, when it is determined that call should be directed to wireless voicemail (block 630—MOBILE), convergence device 120 may forward two (2) versions of the call to mobile device 110-1 via wireless switch 130 (block 640). In one implementation, the value a FROM field for each of the two calls may be set to a dummy or predetermined value, such that mobile device 110-1 receiving the call may be configured to ignore or disregard the call, thereby not visibly or audibly alerting the user to the call.

In other embodiments, the two versions of the call may be spaced apart in time by a predetermine interval, such as approximately 1-2 seconds, with a first call being provided with the dummy FROM value, and the second call being provided with a FROM value corresponding to the original FROM value of the call received by convergence device 120. In this manner, the first call, directed to mobile device 110-1 may be easily ignored by mobile device 110-2, while the second call, for forwarding to wireless VM server 132, may be accurately received and identified by wireless VM server 132.

After the call to wireless VM server 132 is answered, the first call to the mobile device may be terminated (block 645). In other embodiments, the first call may be canceled after a predetermined period of time (e.g., 1-5 seconds). As briefly described above, in some implementations, voicemail handling logic 320 may monitor each call (e.g., via acknowledgement signals received from wireless switch 130) to determine which call is answered (e.g., the VM call) and which call is "ringing" (e.g., the mobile device call) to determine which call to terminate. In other embodiments, the "first" generated call may be terminated.

Figure 7A:
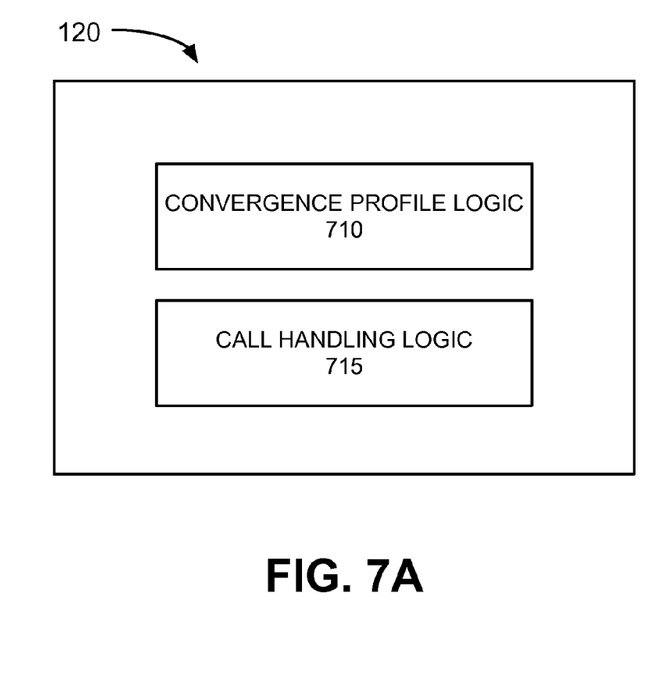
FIGS. 7A and 7B are functional block diagrams of additional exemplary components implemented in the convergence device and convergence voicemail server of FIG. 1.
Figure 7B:
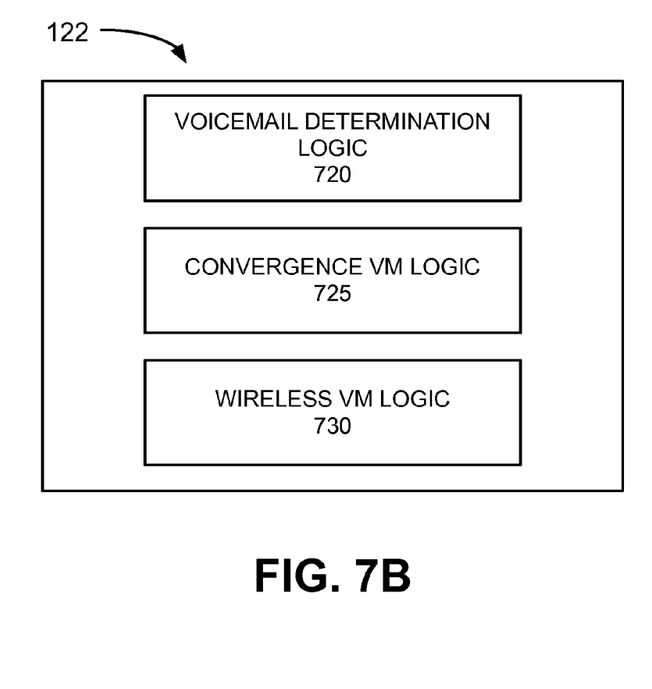

FIG. 7A is an exemplary functional block diagram of components implemented in convergence device 120 and FIG. 7B is an exemplary functional block diagram of components implemented in convergence VM server 122 according to another exemplary implementation. All or some of the components illustrated in FIGS. 7A and 7B may be stored in respective memories 230 of convergence device 120 and convergence VM device 122. For example, memory 230 of convergence device 120 may include convergence profile logic 710 and call handling logic 715 and memory 230 of convergence VM server 122 may include voicemail determination logic 720, convergence voicemail logic 725, and wireless voicemail logic 730.

Convergence profile logic 710 and call handling logic 715 in convergence device 120 may be configured in a manner similar to that of convergence profile logic 310 and call handling logic 315 described above in relation to FIG. 3. For example, convergence profile logic 710 may include logic configured to receive and/or store a convergence profile associated with a user of mobile device 110-1 and user device 110-2. Call handling logic 715 may be configured to receive calls from network 140, process the calls based on information in profile logic, and forward the calls based on the processing. More specifically, call handling logic 715 may be configured to determine whether to forward a received call to voicemail, based on, for example, information in the convergence profile, elapsing of a predetermined period of time, or occurrence of a predetermined number of "rings" since a call was forwarded during which a call remains unanswered, etc.

In any event, call handling logic 715 may be configured to forward calls to convergence VM server 122 based on the determination.

Voicemail determination logic 720 in convergence VM server 122 may be configured to receive a call from call handling logic 715 and determine a destination voicemail server based on, among other things, an OCN identifier or SIP Diversion header field value associated with the call, and whether a wireless VM feature has been enabled or activated within the convergence profile. When voicemail determination logic 720 determines that the originally called device is a mobile device, voicemail determination logic 720 may determine, based on the convergence profile, whether voicemails associated with the mobile device are to be forwarded or directed toward the voicemail system (e.g., wireless VM server 132) associated with the mobile device. As described above, convergence profile 400 may include, e.g., in a condition field 416, a value indicating that a call deposited or forwarded to the convergence program from a mobile device included in the convergence program (e.g., mobile device 110-1), that is not answered via the convergence system, should be forwarded to wireless VM server 132.

When voicemail determination logic 720 determines that the received call is to be handled by the convergence voicemail system associated with the convergence plan (e.g., the OCN or Diversion field header does not equal a device ID of mobile device 110-1), the call may be processed by convergence voicemail logic 725. Consistent with embodiments described herein, convergence voicemail logic 725 may be configured to answer the call with a voicemail greeting, record a message from a caller, and store the message for subsequent retrieval. In some implementations, convergence voicemail logic 725 may be configured to identify a particular greeting for a call based on information in convergence profile 400, such as an indication of a caller group (e.g., work, friends, family, etc.), greetings associated with particular callers (e.g., based on caller ID information associated with the call), etc.

When voicemail determination logic 720 determines that the received call is to be forwarded toward the wireless voicemail system associated with a mobile device (e.g., the OCN or Diversion field header does equals the device ID of mobile device 110-1), the call may be forwarded to wireless voicemail logic 730.

Wireless voicemail (VM) logic 730 may be configured to forward two (2) versions of the received call back to the mobile device (e.g., mobile device 110-1) via wireless switch 130. Wireless switch 130 may be configured to pass one of the calls to the mobile device and automatically forward the second of the calls to wireless VM server 132. After a predetermined period of time (e.g., 1-5 seconds), the first call to the mobile device may be terminated, leaving only the call forwarded to wireless VM server 132. In one implementation, wireless voicemail logic 730 may monitor each call to determine which call is answered (e.g., the VM call) and which call is "ringing" (e.g., the mobile device call) to determine which call to terminate.

By providing a mechanism for predictably forwarding a call to a wireless voicemail system from a device or system external to the wireless voicemail system, devices may be incorporated within a convergence plan or program and still yield predictable results with respect to the location and availability of stored voicemail messages. For example, a user of a mobile device may desire that unanswered mobile calls be forwarded or routed to other devices via a convergence plan, thereby increasing the chance that such calls will be answered. However, in the event that the call remains unanswered, the user may wish that callers be presented with the user's wireless voicemail greeting (e.g., a personal greeting) rather than a more general and possibly business-oriented convergence greeting and that any resulting voicemail messages to be stored on their wireless voicemail account. In the above-described system, such functionality may be realized without requiring system-level integration with the wireless network system associated with the mobile device.

The foregoing description of exemplary implementations provides illustration and description, but is not intended to be exhaustive or to limit the embodiments to the precise form disclosed. Modifications and variations are possible in light of the above teachings or may be acquired from practice of the embodiments. Further, while series of blocks and calls have been described with respect to FIGS. 5 and 6, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computing device implemented method comprising:
receiving, at a computing device, a call originally directed to a mobile device,
wherein the computing device is different than the mobile device;
forwarding, by the computing device, the call to at least one other device different than the computing device and the mobile device;
determining, by the computing device, that the forwarded call is not answered at the at least one other device;
forwarding, by the computing device and when it is determined that the forwarded call is not answered at the at least one other device, two versions of the call to the mobile device, such that one of the two versions of the call is automatically directed toward a voicemail account associated with the mobile device; and
canceling the other of the two versions of the call.

2. The method of claim 1, wherein the call comprises a public switched telephone network (PSTN) call, a voice over Internet protocol VOIP call, or a wireless network telephone call.

3. The method of claim 1, further comprising:
determining whether the call is a call originally directed to the mobile device; and
forwarding the two versions of the call to the mobile device when the call is a call originally directed to the mobile device.

4. The method of claim 3, wherein determining whether the call is a call originally directed to the mobile device comprises:
determining an identifier relating to the originally called mobile device associated with the call;
locating the identifier in one profile of a number of profiles; and
determining a device type associated with the identifier in the one profile.

5. The method of claim 4, wherein forwarding the call to at least one other device further comprises:
identifying the at least one other device from the one profile.

6. The method of claim 4, wherein the identifier relating to the originally called device comprises one of an originally called number (OCN) value or a Diversion header field.

7. The method of claim 6, wherein determining that the forwarded call is not answered comprises:
determining that a predetermined time period during which the forwarded call is not answered has elapsed; or
receiving a call rejection request or an ignore request from each of the at least one other device.

8. The method of claim 6, wherein forwarding two versions of the call to the mobile device comprises:
generating a first call having a TO identifier associated with the mobile device; and
generating a second call having a TO identifier associated with the mobile device.

9. The method of claim 8, wherein the second call is generated after a predetermined period of time following generating the first call.

10. The method of claim 8, further comprising:
determining when one of the first call or the second call has been answered; and
terminating the other of the first call or the second call when it is determined that one of the first call or the second call has been answered.

11. The method of claim 1, wherein forwarding two versions of the call to the mobile device further comprises:
generating the two versions of the call to include a predetermined dummy FROM identifier,
wherein the mobile device is configured to ignore calls associated with the dummy FROM identifier.

12. A non-transitory computer-readable medium including instructions for execution by a processor, comprising:
one or more instructions for receiving, at a computing device, a call originally directed to a mobile device, wherein the computing device is different than the mobile device;
one or more instructions for forwarding, by the computing device, the call to at least one other device different than the computing device and the mobile device;
one or more instructions for determining, by the computing device, that the forwarded call is not answered by the at least one other device;
one or more instructions for forwarding, by the computing device and when it is determined that the forwarded call is not answered at the at least one other device, two versions of the call to the mobile device, such that one of the two versions of the call is automatically directed toward a voicemail account associated with the mobile device; and
one or more instructions for determining which of the two versions of the call has been answered; and
one or more instructions for canceling the other of the two versions of the call.

13. The non-transitory computer-readable medium of claim 12, further comprising:
one or more instructions for determining whether the call is a call originally directed to the mobile device; and
one or more instructions for forwarding the two versions of the call to the mobile device when the call is a call originally directed to the mobile device.

14. The non-transitory computer-readable medium of claim 12, wherein the one or more instructions for forwarding two versions of the call to the mobile device further comprise:
one or more instructions for generating the two versions of the call to include predetermined dummy FROM identifier,
wherein the mobile device is configured to ignore calls associated with the dummy FROM identifier.

15. A computing device comprising:
a memory to store instructions; and
a processor configured to execute the instructions to:
receive a call originally directed to a mobile device, wherein the computing device is different than the mobile device;
forward the call to at least one other device different than the computing device and the mobile device;
determine that the forwarded call is not answered at the at least one other device;
forward, when it is determined that the forwarded call is not answered at the at least one other device, two versions of the call to the mobile device, such that one of the two versions of the call is automatically directed toward a voicemail account associated with the mobile device; and
cancel the other of the two versions of the call.

16. The computing device of claim 15, wherein, when determining whether the call is a call originally directed to the mobile device, the processor is further configured to:
determine an identifier relating to the originally called mobile device associated with the call, wherein the identifier relating to the originally called device comprises one of an originally called number (OCN) value or a Diversion header field;
locate the identifier in one profile of a number of profiles; and
determine a device type associated with the identifier in the one profile.

17. The computing device of claim 15, wherein, when determining that the forwarded call is not answered at the at least one other device, the processor is further configured to:
determine that a predetermined time period during which the forwarded call is not answered has elapsed; or
receive a call rejection request or an ignore request from each of the at least one other device.

18. The computing device of claim 15, wherein, when forwarding two versions of the call to the mobile device, the processor is further configured to:
generate a first call having a TO identifier associated with the mobile device; and
generate a second call having a TO identifier associated with the mobile device.

19. The computing device of claim 15, wherein the processor is further configured to:
- determine when one of the first call or the second call has been answered; and
- terminate the other of the first call or the second call when it is determined that one of the first call or the second call has been answered.

20. The computing device of claim 15, wherein, when forwarding two versions of the call to the mobile device, the processor is further configured to:
- generate the two versions of the call to include a predetermined dummy FROM identifier, wherein the mobile device is configured to ignore calls associated with the dummy FROM identifier.

* * * * *